United States Patent [19]

Müller

[11] Patent Number: 4,669,262
[45] Date of Patent: Jun. 2, 1987

[54] HYDRODYNAMIC CONTROL COUPLING

[75] Inventor: Helmut Müller, Heidenheim, Fed. Rep. of Germany

[73] Assignee: J.M. Voith GmbH, Fed. Rep. of Germany

[21] Appl. No.: 780,567

[22] Filed: Sep. 26, 1985

[30] Foreign Application Priority Data

Sep. 28, 1984 [DE] Fed. Rep. of Germany ....... 3435659

[51] Int. Cl.$^4$ ...................... F16D 33/02; F16D 33/06
[52] U.S. Cl. ...................................... 60/347; 60/352; 60/357
[58] Field of Search ................. 60/347, 336, 337, 338, 60/339, 352, 357, 364

[56] References Cited

U.S. PATENT DOCUMENTS

| 2,127,738 | 8/1938 | Kugel | 60/352 |
| 2,875,581 | 3/1959 | Kugel | |
| 4,516,399 | 5/1985 | Höller et al. | 60/357 |

FOREIGN PATENT DOCUMENTS

| 836718 | 4/1952 | Fed. Rep. of Germany . | |
| 883987 | 7/1953 | Fed. Rep. of Germany . | |
| 1218228 | 6/1966 | Fed. Rep. of Germany . | |
| 1230628 | 12/1966 | Fed. Rep. of Germany | 60/357 |
| 3211337 | 8/1984 | Fed. Rep. of Germany . | |
| 1272517 | 5/1972 | United Kingdom | 60/352 |
| 229115 | 2/1969 | U.S.S.R. | 60/347 |

Primary Examiner—Douglas Hart
Attorney, Agent, or Firm—Ostrolenk, Faber, Gerb & Soffen

[57] ABSTRACT

The hydrodynamic control coupling has primary and secondary vane wheels (2,4 respectively) inclined to the coupling axis (20) and a working space (5) which is provided with an inlet (6) and an outlet (7) for the working medium, the working medium capable of being diverted from the working space into a receiving chamber (10) via tangential bores (7) running in the direction of the flow, a valve (8) being provided which determines the rate at which the working space fills. In accordance with the invention, the receiving chamber for the working medium is located radially inwardly of the working space and is defined by walls of the primary and secondary vane wheels. Such an arrangement of the coupling enables it to be constructed with smaller dimensions and to be simply controlled.

6 Claims, 3 Drawing Figures

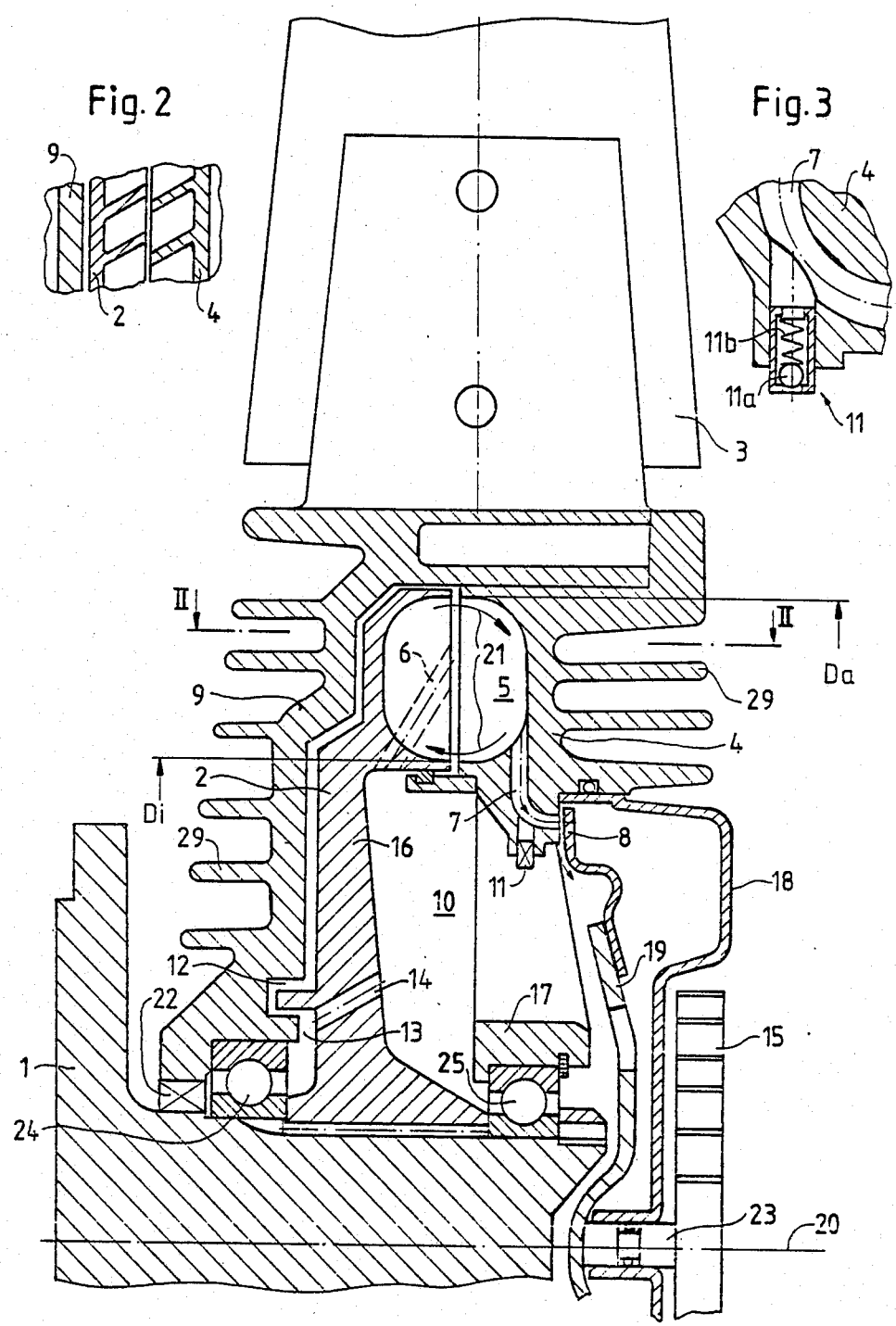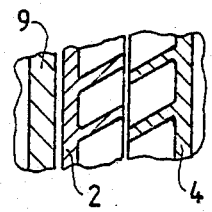

HYDRODYNAMIC CONTROL COUPLING

The invention relates to a hydrodynamic control coupling of the type having a primary vane wheel and a secondary vane wheel, the vanes of which are inclined to the coupling axis, the vane wheels defining a toroidal working space, which is provided with an inlet and an outlet for the working medium, said outlet comprising at least one outlet bore running tangentially with respect to the working space for diverting the working medium into a receiving chamber via a valve which determines the filling rate of the working space.

In German Laid-Open Patent Specification 32 11 337 there is described a control coupling in which the ratio between the external and internal diameter of the working space is approximately 2. With the smallest and simplest possible construction it offers a rapid adjustment to a high torque, which is however independent of slip. For this purpose outlet bores are connected to the working space, so that the working medium can be drained from the working space into fixed channels via a pressure-regulating appliance in the form of an overflow valve. To define the toroidal working space the said outlet bores run tangentially approximately in a direction radial to the coupling axis (seen in longitudinal section through the coupling). The working medium leaving the overflow valve arrives in a receiving chamber, from which it is pumped by a pump via an inlet back into the working space. In this arrangement, the overflow valve is influenced by a temperature-dependent impulse. For this purpose a temperature probe is disposed in, for example, the cooling water circuit of an engine which, depending on the temperature of the water, causes a variable initial stress in valve springs for the overflow valve. If, for example, the cooling water is still relatively cool, there is no necessity to rotate the cooling fan, or ventilator, too if the rotational speed or the performance of the engine suddenly increases, or to make it rotate if the rotational speed is rising. The temperature probe is arranged to ensure a low initial stress at the overflow valve, whereby this just opens with a slight pressure and consequently the coupling empties when the torque is small. The ventilator therefore rotates only with low rotational speed and the engine performance is reserved completely for the traction of the vehicle it is driving. As the cooling water continues to warm up the overflow valve springs are stressed more and more, causing a higher pressure in the outlet bores and forcing the coupling to transmit a higher torque, so that the rotational speed of the ventilator correspondingly increases. This control operation can occur automatically and consequently improves the economy of the engine.

The object of the present invention is to improve further the hydrodynamic control coupling described above, more particularly to reduce its size even more and to create a simple and cheap control arrangement.

In accordance with the invention, this object is achieved by such a control coupling which is characterised in that the ratio between the external and internal diameter (Da/Di) of the working space is only approximately between 1.2 and 1.6, and in that the receiving chamber is disposed radially inside the working space and is surrounded by walls of the primary and secondary vane wheel.

The rather small ratio between the external and internal diameter of the working space means that the vanes of the coupling are positioned radially outwardly as far as possible. This creates correspondingly large free space radially inwardly of the coupling which can serve as the receiving chamber for the working medium. With such a coupling external oil lines which are susceptible to trouble are avoided, and a pump for the distribution of the working medium can be omitted. Also, the structural size of the coupling becomes smaller because of the receiving chamber being integrated into the coupling.

In U.S. Pat. No. 2,570,768 there is described a coupling in which the ratio between the external and internal diameter of the working space is approximately 3, the coupling being provided an internal area to receive working medium. However, the working medium only reaches this area during start-up, by which the start-up of the secondary side, when the primary rotational speed is at maximum or nearly maximum, is facilitated by limiting the torque transmitted. Also, the receiving area is substantially defined by walls of the primary vane wheel.

In contrast to this, with the coupling according to the invention, it is advantageous if the receiving area (or chamber) is located substantially within a free space defined by the secondary vane wheel. In this way, the rotational speed in the receiving chamber is determined by the secondary rotational speed. This means that, e.g. with an almost stationary engine cooling fan, or ventilator, to which the secondary vane wheel is normally connected, the working medium can escape from the working space without counterpressure into the receiving chamber. Consequently, the ventilator's rotational speed actually remains low until a thermo-couple causes the outlet bores of the working space to shut via the adjustable overflow valve.

In an advantageous manner, the outlet bores in the secondary vane wheel, which as discussed above are disposed tangentially to define the toroidal working space, are also directed inwardly towards the coupling axis so that the working medium can discharge inwardly towards the coupling axis without any problems.

In a further refinement of the invention (see claim 4), provision can be made that at least one additional overflow valve actuated by centrifugal force can be disposed in the outlet, which opens at a specific rotational speed.

More particularly, modern super-charged diesel engines are very susceptible to rotational speed thrust, the torque moreover increasing with rotational speed thrust. The result of this is that the power delivery is almost constant in the normal speed range of the engine, regardless of the actual degree of thrust. Thus, there is sometimes the danger that, at maximum rotational speed, over-cooling occurs, or the performance of the ventilator is too high. Thus, where an additional overflow valve is provided, this ensures that a lower ventilator rotational speed is used with high engine rotational speeds. This occurs automatically by the additional overflow valve allowing working medium to flow from the working space into the receiving chamber if the rotational speed of the secondary side of the control coupling exceeds a certain value.

Another advantageous refinement of the invention is provided by the feature of claim 5. This guarantees a reliable seal towards the outside, while avoiding an attack on the outer seal by oil pressure.

An exemplified embodiment of the invention is described in principle in the following and with reference to the accompanying drawing, in which:

FIG. 1 shows a longitudinal section (half section) through the hydrodynamic control coupling.

FIG. 2 shows a partial section along line II—II of FIG. 1.

FIG. 3 shows an enlarged segment of FIG. 1.

The control coupling comprises a drive shaft 1 having a primary vane wheel 2 and a secondary vane wheel 4. In this embodiment, the vane wheel 4 is arranged to drive a vane rim 3 for a cooling fan, or ventilator, connected thereto. Furthermore, the secondary vane wheel 4 is connected to an annular sleeve 9 in such a manner that the connected parts enclose the primary vane wheel 2. In the bore of the sleeve 9 and an axle ring 17 forming part of the secondary vane wheel is disposed a ball bearing 24, 25 respectively for rotatably mounting the secondary vane wheel 4, and hence the ventilator vane rim 3 on the drive shaft 1. The vane wheels 2 and 4 define a toroidal working space 5 which axis is indicated by the reference 20; the direction of flow of the working medium (e.g. oil) in the working space 5 is indicated by the arrows 21.

One or more outlet bores 7 lead from the radially inner area of that part of the working space 5 defined by the secondary vane wheel 4 into a receiving chamber 10, which is defined substantially by an axle disc 16 forming part of the primary vane wheel 2 and a cover 18 carried by and rotating with the secondary vane wheel 4. The receiving chamber 10 is permanently connected via at least one inlet channel 6 (leading through the primary vane wheel 2) with the central area of the toroidal working space 5. From the working space 5, the outlet bores 7 initially run tangentially to define the working space and in a radial direction with respect to the coupling axis 20, and when bend into an approximately axial direction as shown in FIG. 1, to open into the receiving chamber 10. The axial diversion is not absolutely necessary; it is only expedient in connection with an overflow valve 8 having a disc-shaped valve body as described below. The orifices of the outlet bores 7 are, of course, covered by the disc of the valve body 8, which disc is flexible and preferably prestressed and is fitted to a disc 19 (preferably disposed coaxially with the coupling axis 20). The rate of opening of the overflow valve 8 can be adjusted, in known manner, by a thermostat 15 disposed on the outside of the cover 18 and thus is shown only schematically. The thermostat is connected to the disc 19 and is arranged to rotate by an amount dependent upon the temperature of cooling air sucked in by the ventilator 3 through a cooling water cooler (not shown), which air temperature is, of course, related to the temperature of the cooling water. By a corresponding rotation of the disc 19, which is connected to the thermostat 15, apertures (not shown) in the valve body 8 are brought more or less, as appropriate, into coincidence with the orifices of the outlet bores 7. For this purpose, the disc 19 is supported by means of a journal 23, on which the thermostat 15 is also fixed, coaxially with the drive shaft in the cover 18. An increase in the temperature of the cooling water results in a displacement of the disc 19 in the shutting direction of the orifices of the outlet bores 7, and consequently in an increase of the filling rate of the coupling. However, other designs of thermostat (and/or of overflow valve) are also conceivable. For example, the arrangement can be such that a change in the temperature of the cooling water results in an adjustment of the initial stressing force of the elastic valve body 8 (or of a spring acting upon a piston-like valve body).

As is evident from FIG. 1, the toroidal working space 5 is located in an extreme radially outward position by providing relatively large diameter axle discs 16 and 17 for the primary and secondary vane wheels 2 and 4 respectively. In other words: the ratio between the external and internal diameter $D_a/D_i$ of the working space is fairly small; it is in fact approximately between the values 1.2 and 1.6, and is preferably 1.4. This produces a large free area for the receiving chamber 10 to be located radially inwardly with respect to the working space. For this, the size of the receiving chamber is chosen so that, if necessary, it can completely accommodate the circulating working medium. As is also evident from FIG. 1, the largest part of the receiving chamber 10 is within a free space provided by the secondary vane wheel 4. For this purpose, the axle disc 17 and the disc 19 of the overflow valve 8 are provided with corresponding perforations. The cover 18 on the secondary vane wheel 4 gives an additional increase in space, but without any more construction space being needed. However, both vane wheels together effectively surround the receiving chamber 10.

In one or several branch line(s), which connect(s) the outlet bore(s) 7 with the receiving chamber 10 by bypassing the outlet valves 8, one further overflow valve 11 is disposed, which can be constructed as shown in detail in FIG. 3. For example, it has a spherical valve body 11a, which is pressed by a spring 11b in the direction of the coupling axis against a valve seat. The spring tension is measured so that the valve body 11a only rises from the valve seat above a relatively high rotational speed because of the centrifugal force acting on it. By this the valve 11, in addition to the valve 8, brings about a further reduction of the rate at which the working space 5 fills. Cooling ribs 29 are provided on the outer surfaces of the secondary vane wheel 4 and the sleeve 9 in order to remove the power loss produced in the form of heat in the coupling.

Between the sleeve 9 and the drive shaft 1 of the primary vane wheel 2 is an external seal 22. Moreover, between the sleeve 9 and the axle disc 16 of the primary vane wheel 2 is disposed an additional seal 12 and radially inside the same a collection chamber 13 for waste oil. As shown, the seal 12 can also be constructed as a labyrinth gap. From the collection chamber 13 at least one communicating bore 14 leads back through the axle disc 16 into the receiving chamber 10.

The slanting vanes (see FIG. 2) achieve, as known, a particularly intensive flow through the working space 5 and consequently a high specific performance. As a result of the permanent pressure connection of the working space 5 via the outlet bores 7 to the valve 8, during the normal operation of the coupling a certain quantity of working fluid constantly discharges into the receiving chamber 10. The pressure prevalent during this is proportional to the torque transmitted respectively by the coupling. If the rotational speed of the primary vane wheel 2, which is generally driven proportionally to the rotational speed of the engine, is suddenly increased, this means a momentary overload for the coupling. The secondary vane wheel 4 still has a lower rotational speed which means that there is high slip. The sudden increase in rotational speed by the primary vane wheel 2 results in a higher pressure at the valve 8 and consequently an increased flow of working medium from the working space 5. In this way the rate at which the working space fills is reduced and consequently the torque of the secondary vane wheel 4 is kept constant despite a higher primary rotational speed. In addition the rate of filling, as explained above, is controlled by the thermostat 15 as a function of the temperature of the engine cooling water.

What is claimed is:

1. A hydrodynamic control coupling having a primary vane wheel and a secondary vane wheel, the vanes of which are inclined to the coupling axis, said vane wheels defining a toroidal working space, to which working medium is fed and discharged via an inlet and an outlet respectively, said outlet disposed in said secondary vane wheel and comprising at least one outlet bore running tangentially with respect to the working space for diverting the working medium into a receiving chamber, and a valve associated with the outlet bore for determining the filling rate of the working space, wherein the improvement comprises said vane wheels being dimensioned so that the ratio between the external and internal diameters of said working space is approximately between 1.2 and 1.6 whereby said working space is at a radially outward position of said vane wheels, and said receiving chamber also being defined by said vane wheels and located radially inside said working space.

2. A hydrodynamic control coupling according to claim 1, wherein said receiving chamber is substantially defined by said secondary vane wheel.

3. A hydrodynamic control coupling according to claim 1, wherein said outlet bore in said secondary vane wheel is directed inwardly towards the coupling axis.

4. A hydrodynamic control coupling according to claim 1, wherein at least one further valve is provided in said outlet bore and arranged to be actuated by centrifugal force.

5. A hydrodynamic control coupling according to claim 4, characterised in that said further valve is disposed in a branch line of said outlet bore.

6. A hydrodynamic control coupling according to claims 1, 2 or 3, and having an external seal which is disposed between the drive shaft and a sleeve which rotates with said secondary vane wheel, wherein as seen from the inside towards the outside, an additional seal is disposed in front of said outer seal, and a collection chamber for waste oil is defined between the two seals which chamber is connected via at least one communicating bore with said receiving chamber.

* * * * *